3,304,280
METHYL ETHYL KETONE SOLUTION OF A TERPOLYMER OF METHYLMETHACRYLATE, BUTYLACRYLATE AND 2-HYDROXYETHYLMETHACRYLATE
Alwyn Senior, Cincinnati, Ohio, assignor to Formica Corporation, Cincinnati, Ohio, a corporation of Ohio
No Drawing. Filed June 1, 1962, Ser. No. 199,281
5 Claims. (Cl. 260—32.8)

This invention relates to a novel class of terpolymers comprising methylmethacrylate, butylacrylate, and 2-hydroxyethylmethacrylate. More particularly this invention relates to a composition of matter comprising a blend of a terpolymer of methylmethacrylate, butylacrylate, and 2-hydroxyethylmethacrylate with a polymethyl ether of a polymethylol melamine. Still further this invention relates to a process for producing a decorative laminate using the aforementioned composition and to the laminate thus produced.

One of the objects of the present invention is to produce a novel class of terpolymers comprising methylmethacrylate, butylacrylate and 2-hydroxyethylmethacrylate. A further object of the present invention is to produce a resinous composition comprising a mixture of a terpolymer of methylmethacrylate, butylacrylate, and 2-hydroxyethylmethacrylate blended with a polymethyl ether of a polymethylol melamine and preferably hexamethyl ether of hexamethylol melamine. A still further object of the present invention is to produce a decorative laminate using the resinous composition of the present invention. These and other objects of the present invention will be discussed in greater detail hereinbelow.

THE TERPOLYMER

The terpolymer of the present invention is prepared by polymerizing from about 70 to 85 mole percent of methylmethacrylate, from about 5 to 10 mole percent of butylacrylate, and from about 10 to 25 mole percent of 2-hydroxyethylmethacrylate, wherein the total mole percent is 100. More particularly when the terpolymer of the present invention is to be used with a polymethoxymethyl melamine, the composition of the terpolymer should contain between about 80 to 85 mole percent of methylmethacrylate, from about 5 to 10 mole percent of butylacrylate, and from about 10 to 15 mole percent of 2-hydroxyethylmethacrylate. More specifically and preferably the terpolymer will be comprised of 82 mole percent of methylmethacrylate, 5 mole percent of butylacrylate and 13 mole percent of 2-hydroxyethylmethacrylate. The process for preparing the terpolymer would be a conventional one and the novelty in the process would reside only in the ingredients entering into the polymerization. A conventional polymerization catalyst can be used to accomplish this polymerization. Such catalysts as tertiary butyl hydroperoxide, ditertiary butyl peroxide, cumene hydroperoxide, benzoyl peroxide, azobisisobutyronitrile and the like may be used. The amount of catalytic material will be conventional, namely, from about 0.01% to about 10% and preferably from about 0.1% to about 1% by weight based on the total weight of monomers. The polymerization may be carried out in bulk but is preferably carried out in the presence of an organic solvent inasmuch as the specific ultimate preferred use of the terpolymer will be in the preparation of a laminate wherein the composition containing the terpolymer is applied from an organic solvent system followed by the drying of the terpolymer containing composition by driving off the solvent. The various conventional organic solvents which may be used for this purpose are benzene, toluene, xylene, mineral spirits, acetone, methyl ethyl ketone and the like.

The amount of terpolymer solids in the organic solvent can likewise be varied over a very substantial range depending on the thickness of the coating desired to be placed on the decorative impregnated print sheet. As a consequence the solids may be varied from about 10% to about 80% by weight based on the total weight of polymeric material and solvent. However, when the lower solids content solutions are used, the film thickness may be insufficient for certain purposes and the use of such a low solids solution may then require the application of two or more successive layers on the surface of the print sheet. When the higher solids content solutions are used, problems may arise in the application step because of the viscosity of the high solids solution. As a consequence, it is preferred that the solids content be varied between about 40 and 60%.

POLYMETHYL ETHERS OF POLYMETHYLOL MELAMINE

Polymethyl ethers of polymethylol melamine are old and well known compounds and the method for their preparation has been published in a plurality of technical journals as well as in the patent literature. Attention is directed to the U.S. Patents 2,998,410 and 2,998,411 as well as 2,918,452.

The greater degree of methylolation and the greater degree of methylation in the polymethyl ether of polymethylol melamine, the more desirable is the ultimate composition and the ultimate laminate. For this reason one would use ideally the hexamethyl ether of hexamethylol melamine sometimes hereinafter referred to as HMMM. In the processes for preparing such a highly etherified, highly methylolated melamine, the analysis of the ultimate product tends to indicate that the methylolation average is less than hexamethylol melamine and by the same token the average degree of methylation appears to be less than the hexamethyl ether. Nevertheless these products are deemed to contain a significant measure of the ideal HMMM compound and lesser amounts of such materials as the tetramethyl ether of tetramethylol melamine, the tetramethyl ether of pentamethylol melamine, the tetramethyl ether of hexamethylol melamine and the pentamethyl ether of hexamethylol melamine. Whatever referred to herein the hexamethoxy methyl melamine would encompass those compositions which contain melamine derivatives that were on an average not fully methylolated nor fully methylated but which approach such full methylolation and etherification so as to be substantially equivalent to the ideal compound. Polymethyl ethers of polymethylol melamine, hereinafter sometimes referred to as PMMM, are monomeric materials but are potentially resin forming materials and can interreact with other materials both monomeric and polymeric such as those containing a terminal alcoholic hydroxy group. The reaction mechanism is not definitely known but it is believed to be in the nature of a transetherification reaction. The terminal group in the above described terpolymer which results from the presence of the 2-hydroxyethylmethacrylate moiety provides such a site for the entrance of the PMMM into the terpolymer molecule. Therefore, the amount of PMMM used in admixture with the terpolymer is calibrated ot the amount of 2-hydroxyethylmethacrylate present in the terpolymer. One can, therefore, utilize from about 0.1 mole to 1.5 moles of the PMMM per mole of the HEMA and preferably on an equimolecular basis. The HMMM is a unique compound inasmuch as it displays solubility characteristics in water as well as in conventional organic solvents. In the formulation of the total composition of the present invention, it is desired to make use of those solvents referred to hereinabove as suitable for the terpolymer solution. All that has been said hereinabove with respect to solids of the terpolymer is equally applicable here to the total composition of terpolymer and PMMM.

In the utilization of the total resinous composition of the present invention, a catalytic agent is unnecessary to achieve cure under certain conditions but for the principal purpose of the present invention, namely, for laminates, it is preferred to make use of such a catalytic material. One can use as a catalyst for the total composition an acidic material such as hydrochloric acid, phosphoric acid, sulfuric acid, nitric acid, acetic acid, phthalic anhydride, p-toluene sulfonic acid and the like. It is frequently desired to incorporate the catalytic material of the total composition at the time of formulation and considerably prior to ultimate use and therefore it is, under these conditions, desirable to make use of a latent catalytic material which will have no adverse effect on the stability of the resinous syrup. Additionally the latent catalyst is desired in order to achieve prolonged stable shelf life of the dry, coated print sheet and to achieve in the ultimate laminate an attractive, pit-free appearance using practical production conditions of drying. Frequently these latent catalysts are the amine or ammonium salts of acidic materials such as those set forth hereinabove. In using these latent catalysts the application of heat to the resinous composition dissociates the amine or ammonium salt and leaves the acidic material available for its catalytic work. The amount of catalyst to be used is conventional and may be varied over the usual range such as about 0.01% to about 5% and preferably from about 0.1% and 2% by weight based on the total weight of the PMMM. The latent catalysts referred to hereinabove have been disclosed in the prior art such as in the U.S. Patents 2,326,727, 2,385,383, 2,750,355, among others.

PREPARATION OF THE LAMINATE

Decorative laminates of the generic class of which a part of the instant invention is directed, are well known and are standard articles of commerce. These conventional laminates are prepared by assembling a plurality of phenolic resin impregnated core sheets on to which is placed a melamine-formaldehyde resin impregnated print sheet and finally as the outermost layer of melamine-formaldehyde resin impregnated overlay sheet. The overlay sheet serves as a protective barrier to the impregnated print sheet. Such an assembly of layers is then formed into a laminate by subjecting the assembly to elevated temperatures in the order to about 130° C. while exerting a pressure of about 1400 p.s.i. The resultant laminate has excellent abrasion properties but it is comparatively expensive to make and sometimes has a "grayness" associated with many laminates that make use of the overlay sheet. Repeated attempts to replace the overlay sheet with a modified melamine-formaldehyde clear top film have failed due to the crazing effect experienced when such a product is exposed to a low relative humidity environment (5 to 25%). By using the process of the present invention, the overlay sheet becomes unnecessary and the print sheet itself coated with the terpolymer-PMMM resinous system of the present invention becomes the outermost layer and such a treated print sheet may be placed directly onto a substrate such as flakeboard at low pressures such as about 100 p.s.i. to 200 p.s.i. and at temperatures of about 145° C. to 160° C. for a period of about 20 to 30 minutes while achieving substantial savings in raw materials and processing costs. Additionally, the clarity of the ultimate laminated print sheet layer is unimpaired because of the absence of the overlay sheet. Higher pressures could be utilized such as 1000 to 1500 p.s.i. but these are unnecessary with the instant laminating compositions.

The preparation of the print sheet itself is accomplished by conventional procedures. A paper foil may be printed with the desired design and then impregnated with a conventional melamine-formaldehyde resin syrup and dried or the paper foil may be impregnated first, dried and then imprinted with the chosen design. This impregnated decorative sheet, available commercially, is then ready as a starting material for use in the process of preparing a laminate in accordance with the concept of the present invention. The impregnated decorative print sheet is then coated with the resinous solution of the present invention on the outside only by any conventional procedure for depositing a layer of such a resinous solution on the decorative sheet such as reverse roller coating and the coated print sheet is then passed through a drying chamber wherein heated air at a temperature of from about 80° C. to 100° C. is passed upwardly through the paper web for a period of about 5 to 10 minutes so as to dry the upper surface of the coated print sheet. Apparently these print sheets can be prepared continuously by starting with a roll of print sheet paper passing it through a conventional melamine-formaldehyde resin syrup bath followed by a drying step, the printing step, the coating step and finally the last drying step. After the final drying step, the coated print sheet web may be wound into a roll and stored until ready for use. The drying conditions with respect to the time and temperature of the coated impregnated print sheet should be controlled so as to produce a dried treated sheet in which the interreaction between the terpolymer and the HMMM is not advanced significantly to the point where it has become thermoset. As a consequence the drying temperatures should be varied between about 80° C. and 100° C. The residence time in the drying chamber will vary inversely with the temperature and may extend from about 5 minutes at the elevated temperatures to about 10 minutes at the lower temperatures.

In order that the concept of the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

Into a suitable reaction vessel equipped with thermometer, stirrer and reflux condenser there is introduced 92.5 parts of methyl ethyl ketone. The charge is heated to a gentle reflux (80° C.) and maintained at that temperature for about 15 minutes in order to drive off any air dissolved in the solvent so as to avoid inhibition of polymerization of the monomers to be added. From a separate holding tank a mixture of 127.1 parts of methylmethacrylate, 9.9 parts of butylacrylate and 26.1 parts of 2-hydroxyethyl-methacrylate are added in small increments at a steady rate over a period of about 4 hours. Simultaneously but separately, there is added 2.4 parts of benzoyl peroxide dissolved in 17.6 parts of methyl ethyl ketone to the gently refluxing solvent. At the end of the two stream addition period the charge is held at gentle reflux for an additional 30 minutes.

Example 2

The terpolymer solution of Example 1 is cooled to about 60° C. and 79.4 parts of hexamethyl ether of hexamethylol melamime dissolved in 91.2 parts of methyl ethyl ketone added rapidly. There is then added 1% by weight based on the weight of the HMMM present of the triethanolamine salt of p-toluene-sulfonic acid.

Example 3

The resinous composition of Example 2 is applied to a dried melamine formaldehyde resin impregnated decorative print sheet on the decorated side thereof using a reverse roll coater. The coated print sheet is dried by heating at a temperature of about 85° C. from the underside of the coated sheet for about 10 minutes. The dried coated print sheet thus produced is superimposed onto a piece of plywood with the decorative side outwardly and the total assembly is then subjected to heat at 145° C. and a pressure of 200 p.s.i. The pressing cycle takes about 10 minutes. The press is then opened and the resultant laminate removed, cooled and inspected. The resultant laminate is substantially devoid of pits and other surface blemishes, has a clear, glossy appearance and when subjected to extremes of humidity conditions displays no permanent adverse effects. In the lower humidity cycle no crazing or cracking was observed and in the steam test no permanent milkiness or cloudiness is imparted to the laminate. Still further no significant telegraphing of depressions or protuberances is observed on the surface of the laminate resulting from the surface of the substrate particularly at the lower pressures, i.e., 100 p.s.i.

The properties of the resultant laminate referred to hereinabove together with the desirable characteristics of solvent resistance, abrasion and crazing resistance makes the instant laminate an ideal product particularly for vertical decorative surfaces, for indoor and outdoor use.

The paper sheets used as the print sheet in making the laminates of the present invention may be any one of a plurality of commercially available paper foils which are prepared by using such fibrous materials as cellulosic fibers, glass fibers, synthetic polymeric fibrillated fibers, such as those disclosed in U.S. Patent 2,810,646.

I claim:

1. A methyl ethyl ketone solution of a terpolymer of (A) from about 70 to 85 mole percent of methylmethacrylate, (B) from about 5 to 10 mole percent of butylacrylate and (C) from about 10 to 25 mole percent of 2-hydroxyethylmethacrylate, wherein the total mole percent is 100, wherein said terpolymer is polymerized in said methyl ethyl ketone.

2. A methyl ethyl ketone solution of a terpolymer of (A) from about 80 to 85 mole percent of methylmethacrylate, (B) from about 5 to 10 mole percent of butylacrylate and (C) from about 10 to 15 mole percent of 2-hydroxyethylmethacrylate, wherein the total mole percent is 100, wherein said terpolymer is polymerized in said methyl ethyl ketone.

3. A methyl ethyl ketone solution of a terpolymer of (A) 82 mole percent of methylmethacrylate, (B) 5 mole percent of butylacrylate, and (C) 13 mole percent of 2-hydroxyethylmethacrylate wherein said terpolymer is polymerized in said methyl ethyl ketone.

4. A composition of matter comprising (1) a methyl ethyl ketone solution of a terpolymer of (A) from about 80 to 85 mole percent of methylmethacrylate, (B) from about 5 to 10 mole percent of butylacrylate and (C) from about 10 to 15 mole percent of 2-hydroxyethylmethacrylate, wherein the total mole percent is 100, wherein said terpolymer is polymerized in said methyl ethyl ketone and (2) from about 0.1 to 1.5 moles of a polymethyl ether of a polymethylol melamine per mole of said hydroxyethylmethacrylate.

5. A composition of matter comprising (1) a methyl ethyl ketone solution of a terpolymer of (A) from about 82 mole percent of methylmethacrylate, (B) 5 mole percent of butylacrylate, and (C) 13 mole percent of 2-hydroxyethylmethacrylate, wherein the total mole percent is 100, wherein said terpolymer is polymerized in said methyl ethyl ketone and (2) 1 mole of a hexamethyl ether of a hexamethylol melamine per mole of said hydroxyethylmethacrylate.

References Cited by the Examiner

UNITED STATES PATENTS

| | | | |
|---|---|---|---|
| 2,204,517 | 6/1940 | Strain | 260—844 X |
| 2,681,897 | 6/1954 | Frazier | 260—850 |
| 2,773,050 | 12/1956 | Caldwell | 260—29.4 |
| 2,816,851 | 12/1957 | Arledter | 161—263 X |
| 2,819,237 | 1/1958 | Daniel | 260—844 X |
| 2,906,724 | 9/1959 | Daniel | 260—856 |
| 2,930,727 | 3/1960 | Baranyi | 161—263 X |
| 2,986,541 | 5/1961 | Zuppinger | 260—67.6 X |
| 2,998,410 | 8/1961 | Jefts | 260—67.6 |
| 2,998,411 | 8/1961 | Housekeeper | 260—67.6 |
| 3,107,227 | 10/1963 | Suen | 260—856 |
| 3,117,053 | 1/1964 | Lawrence | 161—263 X |
| 3,218,225 | 11/1965 | Petropoulos | 260—856 X |

FOREIGN PATENTS

| | | |
|---|---|---|
| 596,750 | 1/1948 | Great Britain. |
| 628,150 | 8/1949 | Great Britain. |

OTHER REFERENCES

Riddle: Monomeric Acrylic Esters, Reinhold Pub. Corp., N.Y., 1954, QD 281 P6 R45, pp. 40–43 and 72–73 relied on.

MORRIS SUSSMAN, *Primary Examiner.*

EARL M. BERGERT, ALEXANDER WYMAN,
*Examiners.*

G. D. MORRIS, *Assistant Examiner.*